Figure 1:
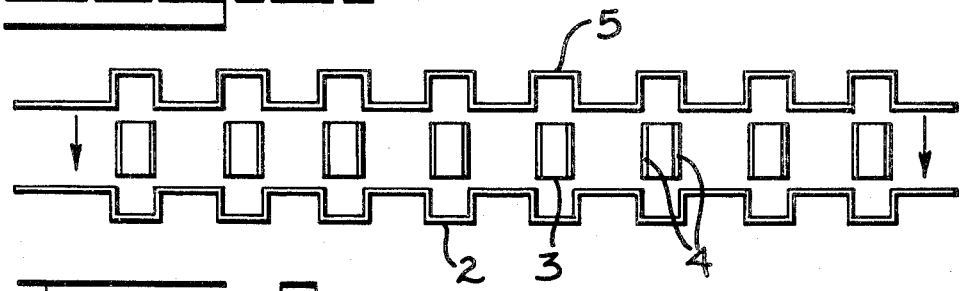
Figure 2:
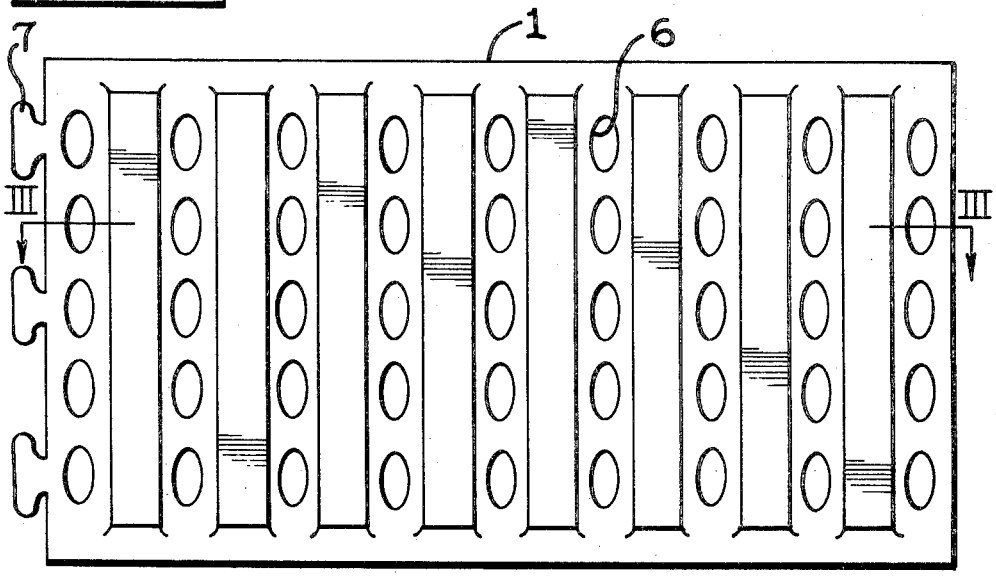
Figure 3:
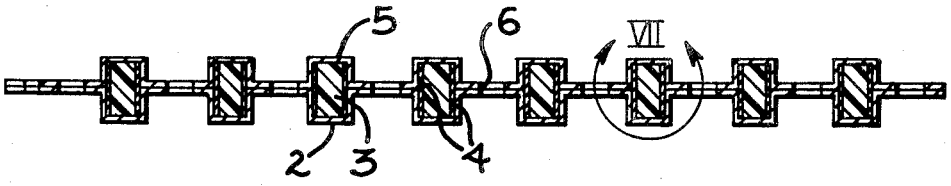
Figure 4:
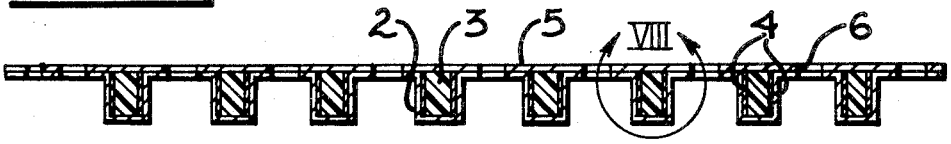

United States Defensive Publication [19] (H) [11] T997,002

Justice [43] Aug. 5, 1980

[54] MAGNETIC FLUID-FILTER ASSEMBLY

[76] Inventor: James F. Justice, 827 N. Rebecca Pl., Peoria, Ill. 61606

[21] Appl. No.: 53,594

[22] Filed: Jun. 29, 1979

Related U.S. Application Data

[63] Continuation of Ser. No. 937,002, Aug. 25, 1978, abandoned.

[51] Int. Cl.[3] ..... B01D 35/06

[52] U.S. Cl. ..... 210/222

[57] ABSTRACT

A cleanable and reusable magnetic fluid-filter assembly (1) includes a plurality of elongate magnetic elements (3) hermetically sealed between two fluid-impervious sheets (2,5) in substantially parallel relation. The sheets (2,5) define relatively thin spacer portions having fluid-flow openings (6) between the magnetic elements (3) and integrally formed connector elements (7) at one end of the sheets (2,5) for releasably interlockingly engaging the openings (6) and maintaining a tubular configuration of the assembly (1).

6 Claims, 2 Sheets Drawing,

9 Pages Specification

The file of this unexamined application may be inspected and copies thereof may be purchased (849 O.G. 1221, Apr. 9, 1968).

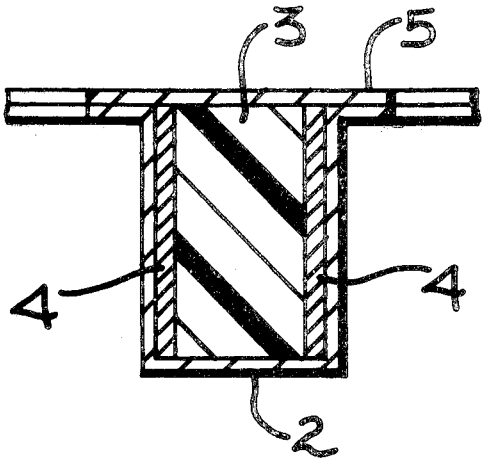

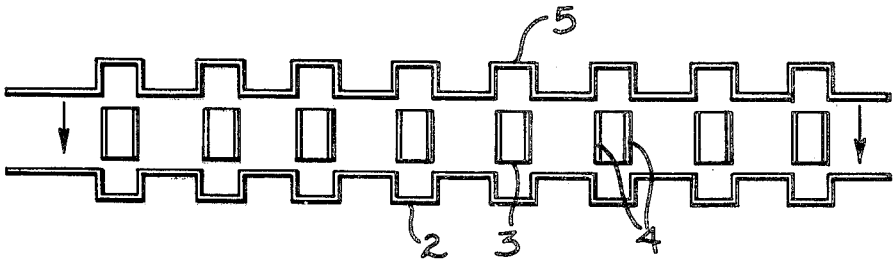

FIG. 5
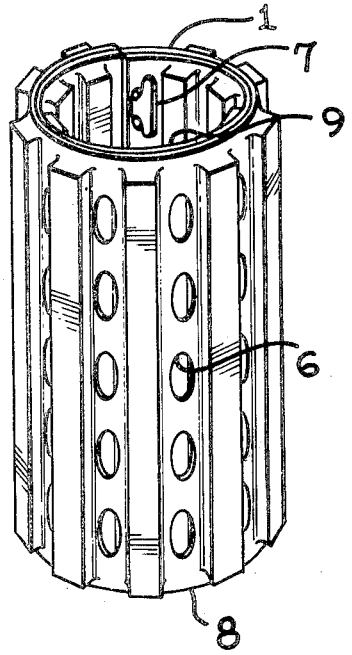
FIG. 6
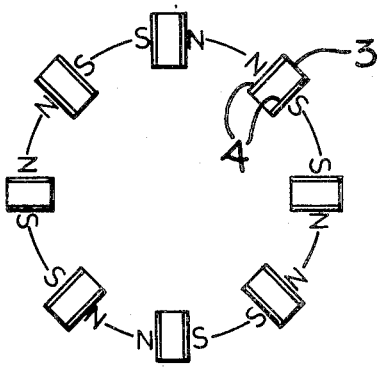
FIG. 7
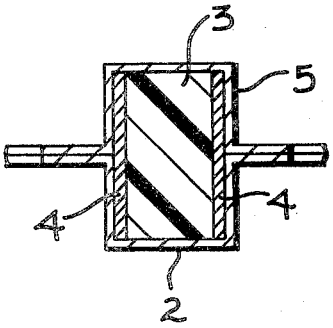
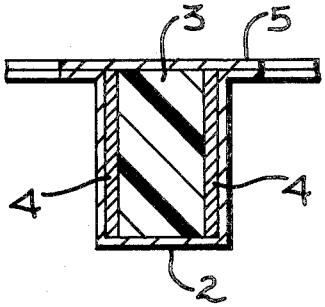
FIG. 8